INVENTOR
E. J. PANNER
BY
ATTORNEY

INVENTOR
E. J. PANNER
BY
ATTORNEY

INVENTOR
E. J. PANNER

BY [signature]
ATTORNEY

Jan. 12, 1960

E. J. PANNER 2,920,826

COMPUTING CIRCUIT

Filed July 1, 1955

6 Sheets-Sheet 4

INVENTOR
E. J. PANNER

BY [signature]

ATTORNEY

Jan. 12, 1960

E. J. PANNER

COMPUTING CIRCUIT 2,920,826

Filed July 1, 1955

6 Sheets-Sheet 5

INVENTOR
E. J. PANNER
BY
ATTORNEY

Jan. 12, 1960

E. J. PANNER 2,920,826

COMPUTING CIRCUIT

Filed July 1, 1955

6 Sheets-Sheet 6

INVENTOR
E. J. PANNER

BY [signature]
ATTORNEY

United States Patent Office 2,920,826

Patented Jan. 12, 1960

2,920,826

COMPUTING CIRCUIT

Edward J. Panner, Allentown, Pa., assignor to Bell Telephone Laboratories, Incorporated, New York, N.Y., a corporation of New York Application July 1, 1955, Serial No. 519,327

13 Claims. (Cl. 235—176)

Figures 1, 7:
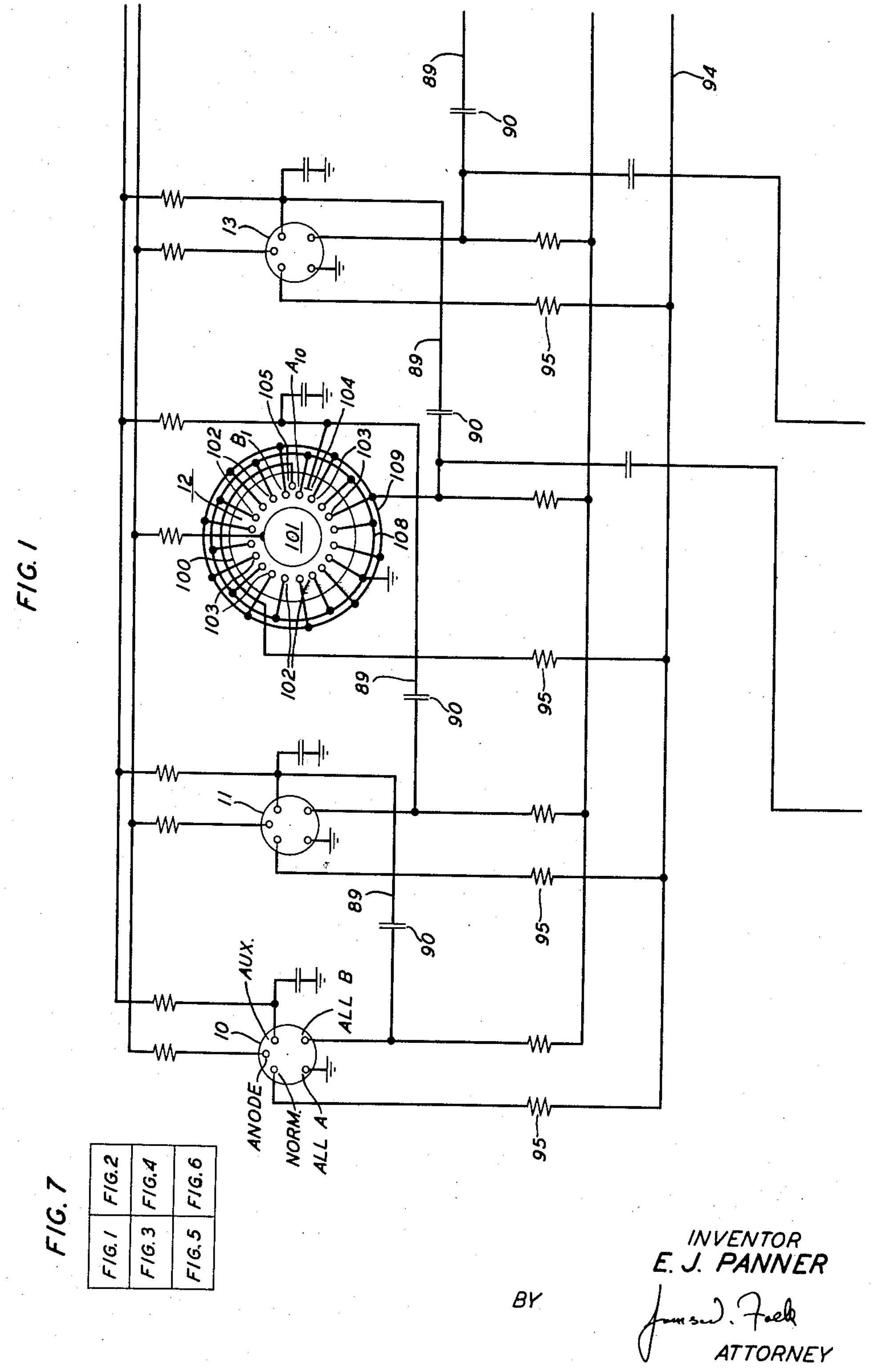

This invention relates to electrical computing circuits and more particularly to such circuits for the summation or addition of decimal numbers.

Priorly adders and other computers have been devised employing a wide variety of basic elements. Those that have operated entirely electrically, as opposed to mechanically or electromechanically, have generally utilized chains, rings, or arrays of vacuum or gas tubes, each possible digit having assigned thereto an individual tube. Thus for adding five digit numbers at least fifty tubes would be required for storage of the number in straight decimal fashion. Such circuits have therefore been relatively complex, requiring a large number of components, and having large power requirements.

It is an object of this invention to provide an improved computer circuit.

It is another object of this invention to provide an improved circuit for the addition of decimal numbers.

Further objects of this invention include reducing the number of active components in computing circuits, reducing the complexity of computing circuits, and also reducing the power requirements of the circuit.

These and other objects of this invention are attained in one specific embodiment wherein two groups of cold cathode stepping tubes are employed, the one group comprising register tubes in which the number to be added is initially registered and the other group comprising totalizer tubes in which the summation of the priorly added numbers and the number registered in the register tube is indicated. The stepping tubes may be of the general type described in M. A. Townsend Patent 2,575,370 of November 20, 1951, and more specifically be of the type described in M. A. Townsend Patent 2,635,810 of April 21, 1953; such tubes are known as the Western Electric 439A tube.

In addition to the totalizer and register stepping tubes this specific embodiment of my invention also includes a pulser circuit comprising pairs of thyratrons, one such pair being associated with each of the register stepping tubes. One thyratron of the pair is a pulser tube and has an alternating voltage applied to its anode; the tube is biased so as to conduct and transmit a stepping pulse only on the peak positive swing of the anode voltage. The other tube is a control tube and has a common cathode connection with the pulser thyratron so that conduction through the control thyratron will prevent conduction through the associated pulser thyratron.

In accordance with an aspect of this invention a number to be added is registered in the register tube circuitry by connecting the rest cathodes of the register tubes for the particular digits to control grids of the control thyratrons associated therewith. Generation of stepping pulses by the pulser thyratron will therefore cause the register stepping tube to step from its normal or zero position to each rest or A cathode in succession. When the discharge is present at the rest cathode connected to the control thyratron, that thryratron breaks down, preventing subsequent breakdown and pulse generation of the pulse thyratron having a common cathode connection therewith, and at the same time applying an enabling bias to a control grid of the pulse thyratron of the next stage, thereby enabling that thyratron to begin transmitting stepping pulses to its associated register stepping tube.

In accordance with another aspect of this invention each register stepping tube has a common input connection or terminal with an associated totalizer stepping tube so that transmission of the stepping pulses from a pulser thyratron to its associated register stepping tube also causes stepping pulses to be applied to a totalizer stepping tube to cause the discharge present therein to be stepped around the same number of cathodes. In this manner the number stored in the register circuitry is transferred to the associated totalizer stepping tube and added to the number already present therein. Each of the totalizer stepping tubes advantageously includes an auxiliary anode connected to the input of the next stage stepping tube so that a carry pulse is transmitted on each passage of the discharge past the last or tenth rest cathode of a totalizer stepping tube; the employment of auxiliary anodes in this manner is broadly as disclosed in the above-mentioned Patent 2,635,810.

When the number to be added is registered in the register tube circuitry by connection of the appropriate rest cathodes to the control grids of the control thyratrons of the pulse generator circuitry, a manual add button may be depressed to close a switch to apply anode potential to the anodes of the thyratrons and commence the operation of the circuit. Each of the register stepping tubes then steps in succession, transferring the discharge therein to the rest cathode connected to the control thyratron of the pulser circuit. The control thyratrons in turn determine the particular pulser thyratron to be firing at a particular time and applying stepping pulses to the register and totalizer tubes. When the last register tube has been stepped to its preselected rest cathode, the last control thyratron is fired, operating a relay which interrupts the circuit applying voltage to the anodes of the thyratrons. Advantageously, however, in accordance with this inventention, anode voltage is applied to the control thyratrons through a condenser which remains charged for a time sufficient to allow all of the register stepping tubes to be reset to their normal or zero cathodes.

Advantageously there are more totalizer stepping tubes than register stepping tubes, no pulses being applied directly from the pulser thyratrons to the higher decade totalizer tubes; instead only carry pulses are applied. The number of stepping tubes to be employed will depend, of course, on the size number it is desired to be able to handle. A manual reset switch is provided to apply a normalizing or zero pulse to the normal or zero cathodes of the totalizer tubes to reset them after completion of a problem. Advantageously the auxiliary anode bias is removed during this resetting of the totalizer tubes.

The summation may be readily observed directly from the totalizer tubes themselves, the various positions of the glow discharge at the different rest cathodes being quite clearly defined in these types of tubes. Accordingly the envelopes of the totalizer stepping tubes are advantageously mounted with just their upper portion protruding through a flat surface and the appropriate digits lettered on the surface around the envelope adjacent the respective rest cathodes.

It is a feature of this invention that a computing circuit comprise a plurality of register stepping tubes to which digit selector switches are connected and a plurality of totalizer stepping tubes to which pulses corresponding to selected digits are transmitted and in which the solution to the computing problem appears.

It is another feature of this invention that each of the register stepping tubes have a common input with an associated totalizer stepping tube, only that number of stepping pulses being applied to this common input terminal corresponding to the digit designated by the register tube circuitry.

It is still another feature of this invention that a digit be designated in the register tube circuitry by connecting the rest cathode of the stepping tube for that digit to a control circuit for stopping the transmission of stepping pulses to that register stepping tube and the totalizer tube connected thereto.

It is a further feature of this invention that the pulser circuitry comprise a pair of thyratrons, one of the thyratrons being a pulser and the other a control element, the two thyratrons having a common cathode connection. More specifically in accordance with this feature of the invention breakdown of the control thyratron inhibits conduction in the pulser thyratron of the same stage and enables conduction instead in the pulser thyratron of the next stage.

Figure 4:
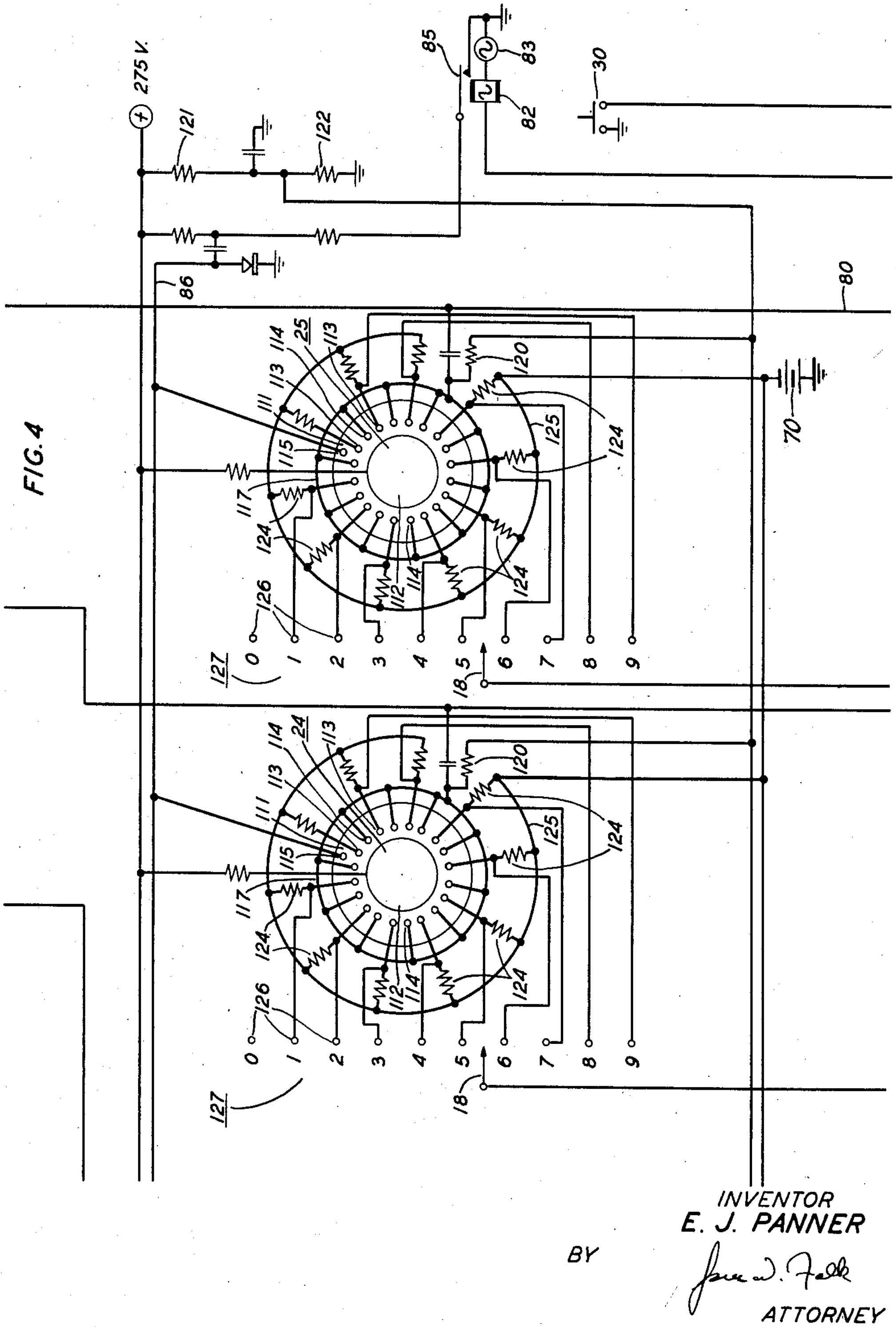
Figure 5:
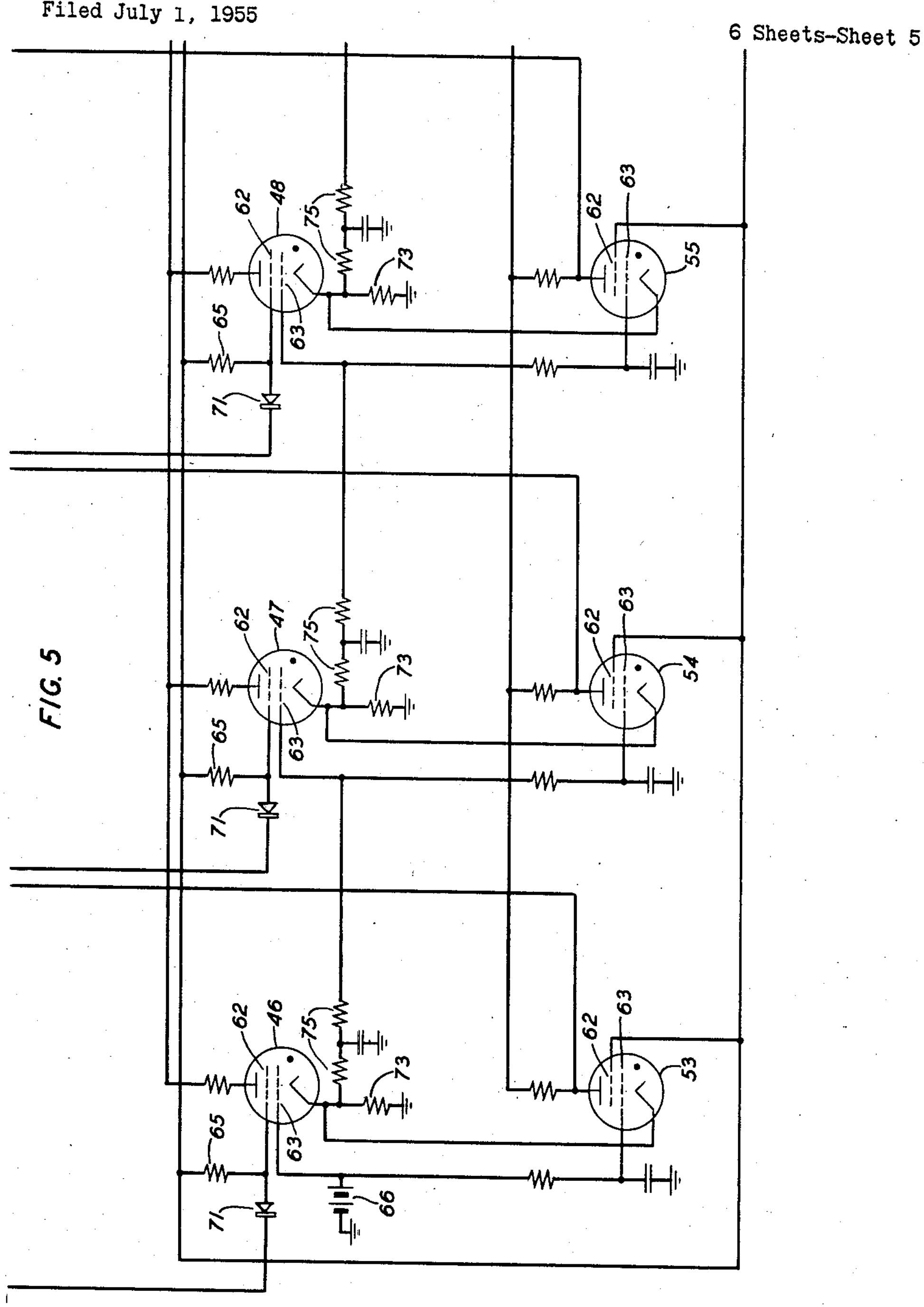
Figures 6, 8:
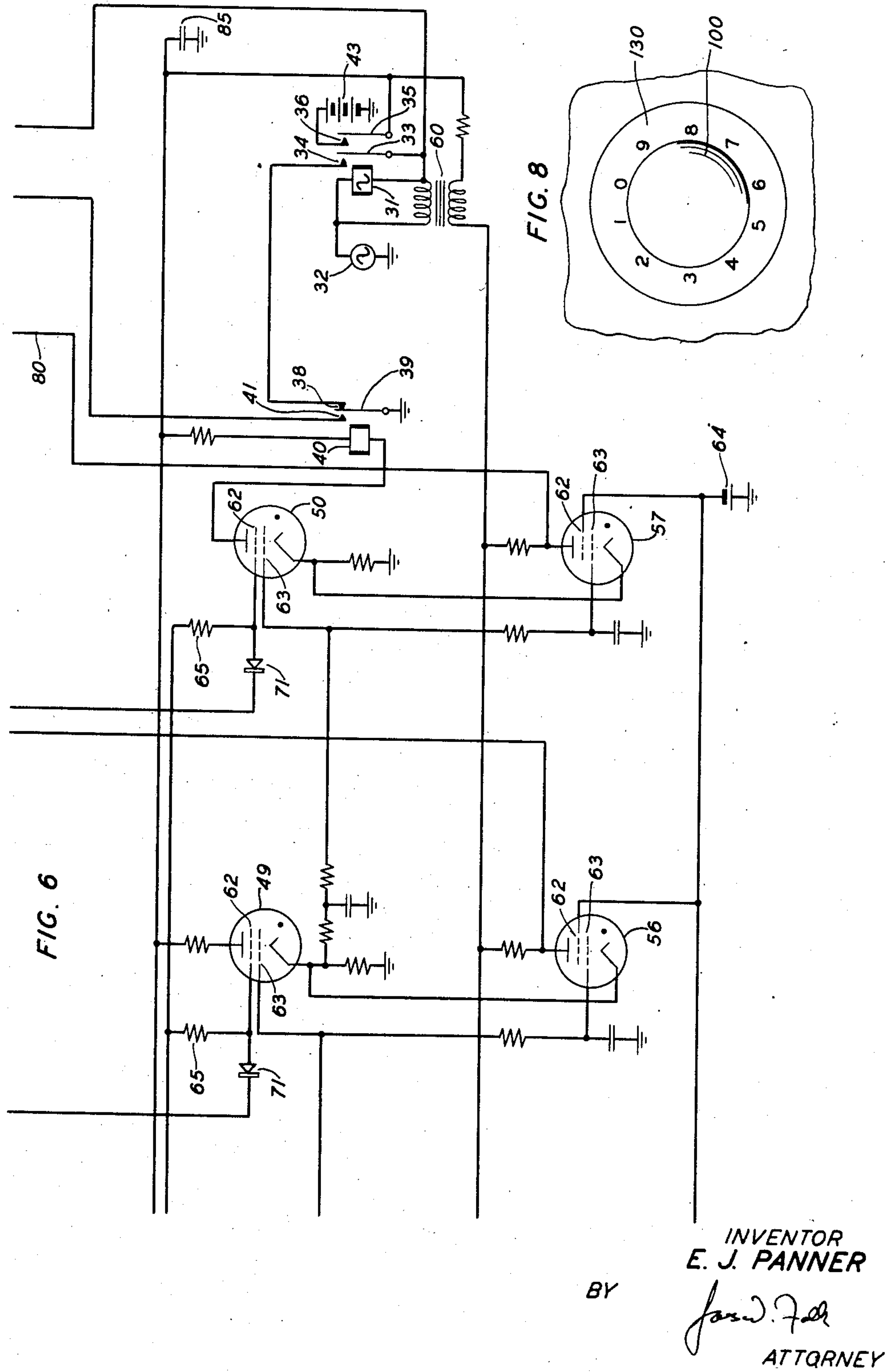

A complete understanding of this invention and of these and other features thereof may be gained from the following detailed description and the accompanying drawing, in which:

Figs. 1 through 6 are a schematic representation of one specific illustrative embodiment of this invention, Fig. 7 being the key diagram showing the arrangement of Figs. 1 through 6; and Fig. 8 is a plan view of the top of one of the totalizer stepping tubes of the embodiment of Fig. 1 depicting particularly the mounting of the tube and the positioning of the indicating digits adjacent thereto.

Figure 2:
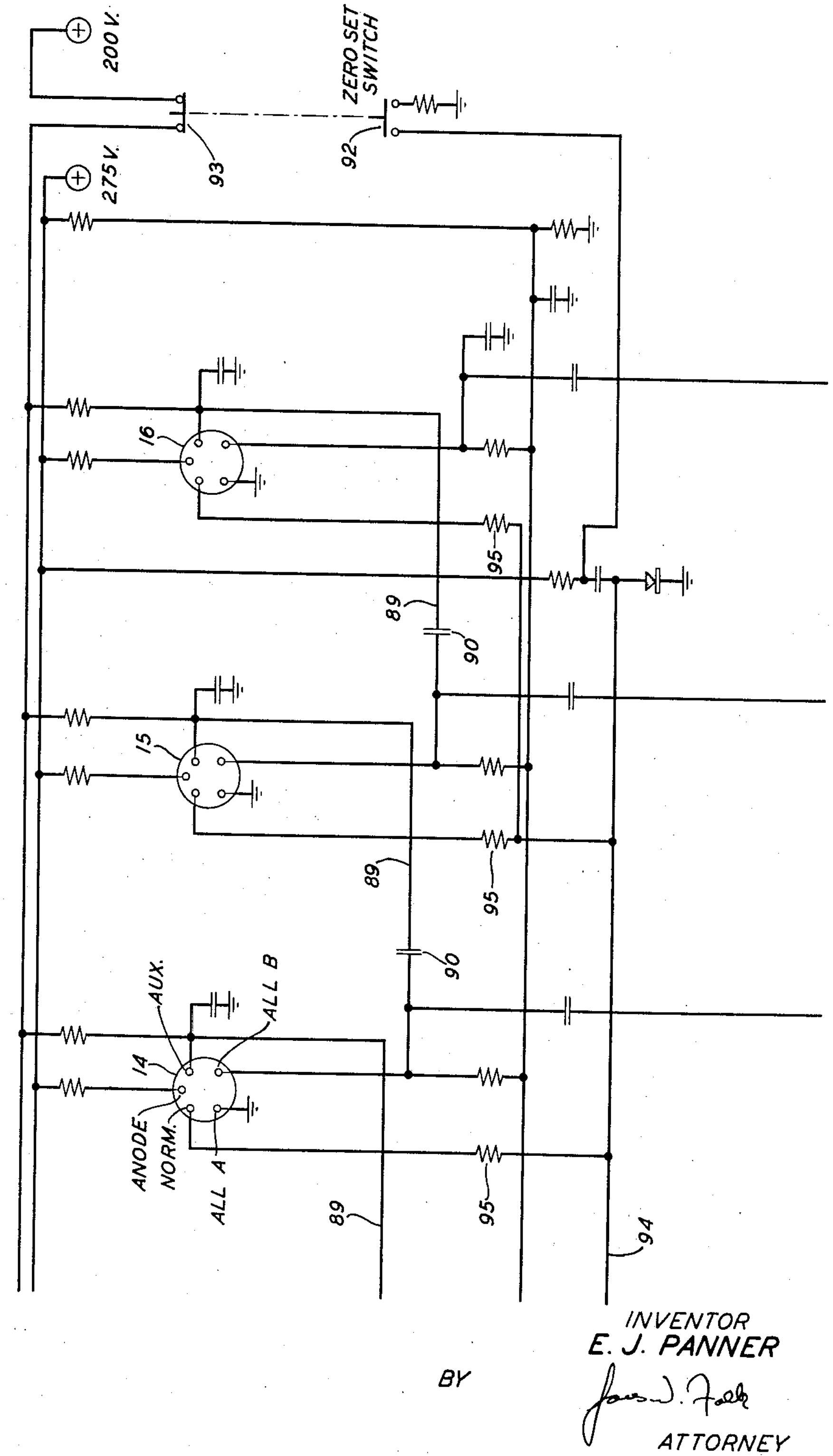
Figure 3:
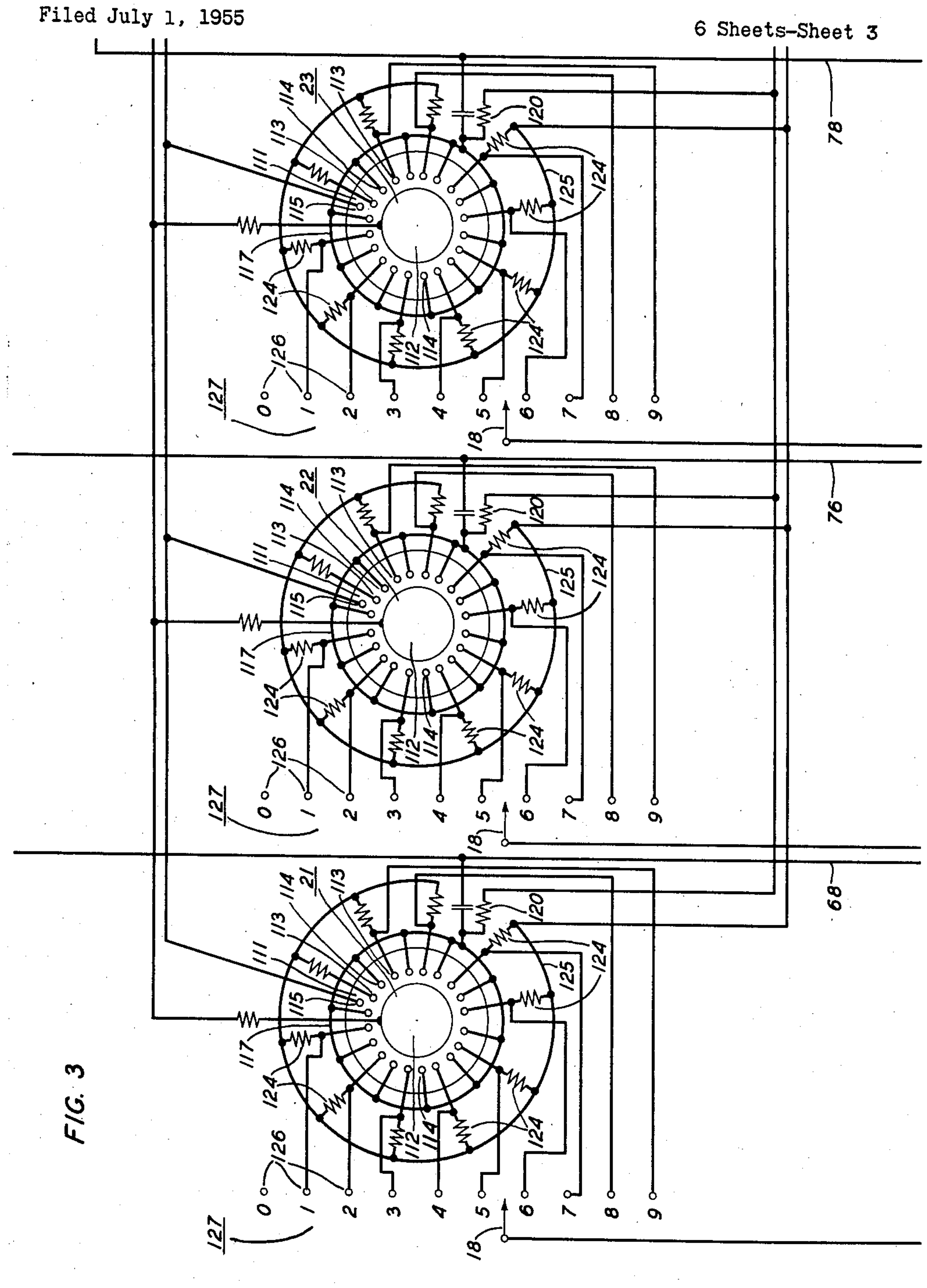

As seen in Figs. 1 through 6 the particular embodiment of this invention therein depicted comprises three essential sections, namely, the totalizer including the totalizer stepping tubes 10 through 16, depicted in Figs. 1 and 2; the register including the register stepping tubes 21 through 25, depicted in Figs. 3 and 4; and the pulse generator and control circuit, including the control thyratrons 46 through 50 and the pulser thyratrons 53 through 57, depicted in Figs. 5 and 6.

Each of the totalizer stepping tubes 10 through 16 may advantageously be of the type known as the Western Electric 439A and shown in M. A. Townsend Patent 2,635,810, April 21, 1953. Each of these tubes, except tube 12, is indicated in the drawing by the connection to the terminal pins thereof with a notation of the internal structure adjacent thereto in order to simplify the drawing, reduce the number of sheets of drawing, and facilitate an understanding of this invention. Tube 12, however, is depicted schematically in Fig. 1 and it is to be understood that each of tubes 10, 11, 13, 14, 15, and 16 is advantageously identical with tube 12.

As seen in Fig. 1 tube 12 comprises an envelope 100, an anode 101, ten rest or A cathodes 102, ten advance or B cathodes 103, an auxiliary anode 104 adjacent the last or tenth A cathode $A_{10}$ and a normal or zero cathode 105 adjacent the first B cathode $B_1$. All of the A cathodes 102 are connected together by a common lead 108, which is connected directly to ground; similarly all of the B cathodes 103 are connected together by a common lead 109 to which lead 109 the input or stepping pulses are applied, as described further below.

Each of the register stepping tubes 21 through 25 may be identical with the totalizer stepping tubes except that the auxiliary anode may be omitted or, if present in the tube, is not connected in the circuitry. Thus each of the register stepping tubes comprises an envelope 111, an anode 112, ten rest or A cathodes 113, ten transfer or B cathodes 114, and a normal or zero cathode 115 adjacent the first transfer or B cathode $B_1$. Each of the B cathodes is connected to a common lead 117 to which the stepping pulses are applied, over stepping pulse leads 68, 76, 78, etc., described further below, from the pulser circuitry. Additionally the B cathodes are connected through a resistor 120 to a voltage divider comprising the resistors 121 and 122, seen in Fig. 4; in this specific embodiment resistor 121 was 47,000 ohms and resistor 122 5,000 ohms so that a bias of approximately +26 volts was applied to the B cathodes.

Each of the A cathodes 113 is connected through a resistor 124 to a common lead 125 in turn connected to a source 70, seen in Fig. 4, which in this specific embodiment was −6.73 volts. Additionally each rest or A cathode except the last or tenth cathode $A_{10}$ is directly connected to a contact 126 of a multiple contact manually operated switch 127 having a wiper or movable contact 18. In accordance with an aspect of this invention the number to be added is registered in the register section of the circuit by setting the contact 18 to the contact 126 connected to the rest cathode corresponding to that digit which it is desired to register. Thus if for that stage a "4" is to be added, the switch contact 18 is connected to the number 4 terminal 126 which is connected to cathode $A_4$, that being the fourth rest cathode 113 from the normal or zero cathode 115 in the direction of transfer of the discharge within the stepping tube.

The pulser circuitry in accordance with this specific embodiment of this invention comprises a plurality of pairs of gaseous discharge devices or thyratrons, one such pair being associated with each register stepping tube 21 through 25. The pairs of thyratrons comprise the control thyratrons 46 through 50 and the pulser thyratrons 53 through 57. Each of the devices may advantageously be of the type known as the 2D21, which is a four electrode gaseous device including control grids 62 and 63. It is to be understood, however, that various other devices might be employed in the pulser and control circuitry in accordance with this invention.

An understanding of this invention and of these and various other elements thereof may best be gained from consideration of the operation of this embodiment in adding a number to a sum priorly placed in the totalizer stepping tubes 10 through 16. Let us assume that the number "54081" is to be added. Accordingly, each of the switches 127 is manually set so that for each the contact 18 is connected to the appropriate terminal 126; thus for the ten thousandth tube 21 the contact 18 is connected to the fifth rest or A cathode, for the one thousandth tube 22 is connected to the fourth A cathode, for the one hundredth tube 23 is connected to the zero terminal, which is not connected to any cathode but is actually an open circuit, et cetera. An add switch 30, seen in Fig. 4, is now manually closed and applies ground to one side of an A.-C. relay 31, seen in Fig. 6, the other side of which is connected to a source 32 of A.-C. potential, which in this specific embodiment was 6.3 volts. Relay 31 is an A.-C. relay, so that on the application of ground to its one side the relay is operated and closes connection between the lower armature 33 and a contact 34, and between the upper armature 35 and a contact 36. Contact 34 is connected through a contact 38 and armature 39 of a relay 40 to ground and thereby locks relay 31 in its operated condition on opening of the switch 30 and until relay 40 operates to transfer armature 39 from contact 38 to contact 41. Contact 36 is connected to a source 43 of D.-C. potential, which in this specific embodiment was +275 volts. Closure of the armature 35 therefore applies 275 volts D.-C. to the anodes of each of the control thyratrons 46, 47, 48, 49, and 50. At the same time, closure of armature 35 to contact 36 applies the 275 volts D.-C. superimposed on 250 volts A.-C. to the anodes of each of the pulser thyratrons 53, 54, 55, 56, and 57. The 250 volts A.-C. is derived through a transformer 60 which may advantageously have a 40:1 turn ratio from the 6.3 A.-C. source 32. Accordingly, the anodes of each of the pulser thyratrons 53 through 57 have applied to them a voltage varying from 75 volts to +625 volts, and the thyratrons are arranged to fire only on the peak positive voltages.

Each of the thyratrons 46 through 50 and 53 through 57 includes a pair of control grids 62 and 63. Control grid 62 of each of the pulse thyratrons 53 through 57 is connected to a source 64 of negative potential which may advantageously in this embodiment be −1.35 volts. Source 64 is also connected through resistances 65 which may advantageously be 2500 ohms to the control grid 62 of control thyratrons 46 through 50, and in the absence of other signals applied to the control grids of these tubes, as described further below, also serves to prime these tubes. Control grids 63 of the first stage thyratrons 46 and 53 are connected to a source 66 which may advantageously in this embodiment be +2.7 volts and which serves to prime these tubes. Accordingly, as soon as the anode voltage from source 43 and transformer 60 applied to the anode of thyratron 53 reaches its peak value, thyratron 53 fires and applies a stepping pulse on lead 68 to the B cathodes of the register tube 21 and the totalizer tube 12.

Thyratron 53 applies successive stepping pulses to these two stepping tubes until the register tube has stepped from its normal cathode to the A or rest cathode to which switch contact 18 is connected. Thus, in this specific example five stepping pulses are applied from pulser 53 to stepping tubes 21 and 12 until the discharge in stepping tube 21 rests at the fifth A cathode. When that occurs, the normal bias applied from source 70, which may be in this embodiment −6.73 volts, to all the A cathodes and thus through switch 18 and a diode 71 to the control grid 62 of tube 46, is overcome and tube 46 fires. Firing of tube 46 causes the voltage appearing at the cathode of tube 53 to increase as the two cathodes are connected together and through a resistor 73 are connected to ground. Accordingly, on the next maximum peak of the anode voltage at tube 53, tube 53 cannot fire and no further stepping pulses appear on lead 68. However, the cathode of tube 46 is also connected through resistances 75 to the control grids 63 of the control thyratron 47 and pulser thyratron 54 of the next stage. Therefore, on firing of tube 46 a voltage is applied to each of these control grids 63 sufficient to enable these tubes to be fired when the appropriate biases are applied to their other electrodes. Thus, on occurrence of the next peak anode voltage at the anodes of the pulser thyratrons, tube 54 breaks down and applies a stepping pulse on lead 76 to the B cathodes of the next stage register and totalizer stepping tubes, namely stepping register tube 22 and totalizer tube 13. Tube 54 continues to apply stepping pulses to lead 76 until register tube 22 has similarly stepped to the rest cathode to which switch contact 18 is connected, at which point the control tube 47 fires and the pulse generator is in effect transferred from lead 76 connected to tubes 22 and 13 to lead 78 connected to the next register tube 23 and totalizer tube 14.

In this specific illustration we have assumed that the digit registered at stepping tube 23 is a zero, and in accordance with one aspect of this invention switch contact 18 is not connected to any of the cathodes of the tube but instead to a zero terminal 126 which is an open circuit. However, as priorly described, source 64, which applies a priming voltage to each of the control grids 62 of the pulser thyratrons, also applies a priming potential to each of the control grids 62 of the control thyratrons in the absence of the larger bias from source 70 which keeps the tubes cut off. Therefore, as tube 48 does not have applied to its through its associated diode 71 the cutoff voltage from source 70, tube 48 can fire immediately upon application of the appropriate voltage to its grid 63 due to the firing of the prior control tube 47. This, in turn, causes the next peak anode voltage applied to the pulser thyratrons to effect breakdown of tube 56 in the next pulsing stage, rather than tube 55. Therefore, no stepping pulses are applied to lead 78 and to the B cathodes of stepping tubes 23 and 14.

This procedure continues until the last register tube 25 has counted the appropriate number of stepping pulses appearing on its input lead 80 from pulser tube 57, which in this illustrative example we have assumed to be only one pulse, as the digit "1" has been designated at stepping tube 25. When that occurs, breakdown of tube 50 takes place, causing current to flow through end cycle relay 40, transferring armature 39 from contact 38 to the contact 41. This breaks the holding circuit on relay 31 and removes anode potential from all of the control and pulser thyratrons.

Contact 41, however, is connected to one side of a zero reset relay 82, seen in Fig. 4, the other side of which is connected to a source 83, which in this specific embodiment may also be 6.3 volts A.-C., relay 82 similarly being an A.-C. relay. Operation of relay 82 closes contact 85, applying a normalizing pulse through lead 86 to each of the normalizing cathodes of the register tubes 21 through 25, thereby resetting each of these tubes.

In accordance with one aspect of this invention the anode voltage for the control thyratrons is obtained from a condenser 85 which is charged by source 43. Accordingly, when armature 35 is opened on release of relay 31 and source 43 removed from the thyratron anodes common potential lead, the control thyratrons will remain on momentarily due to the charge stored on condenser 85. Current through thyratron 50 will keep relay 40 operated, thus applying ground through armature 39 to relay 82 for a time sufficient to enable all of the register stepping tubes to be replaced in their initial or normal conditions. When condenser 85 has discharged to a point that its voltage is no longer sufficient to maintain conduction in the control thyratrons, they will extinguish. Cessation of current through thyratron 50, releases relay 40, in turn causing relay 82 to release and removing the normalizing voltage from lead 86. The circuit is now in condition to have the next number registered in the register stepping tubes 21 through 25 and to have this next number added to the priorly summed number now appearing at the totalizer stepping tubes 10 through 16.

Advantageously each of the stepping tubes 10 through 16 is arranged so that the position of the glow discharge is readily apparent by visual inspection of the tube. Accordingly, as seen in Fig. 8, an index card 130 is positioned around the envelope of a tube having digits thereon corresponding to the digit value of the rest cathode adjacent thereto. Further, as is readily apparent in the circuit of Figs. 1 and 2, each of the auxiliary anodes 104 of the totalizer tubes 11 through 16 is connected through a lead 89 and a condenser 90 to the B or transfer cathodes 103 of the succeeding totalizer tube, so that on stepping of one of the totalizer tubes past its tenth rest cathode 102 to which the auxiliary is adjacent, a carry pulse is transmitted to the totalizer tube of the next higher order. Accordingly, as is apparent from the drawing, the number of totalizer tubes is not limited to the number of register stepping tubes but is advantageously larger. Thus, while each of the register stepping tubes has a common input with one of the totalizer stepping tubes, one or more of the totalizer stepping tubes may have no inputs directly to the pulser circuit or to the register stepping tubes, the only inputs to these tubes being carry pulses from the prior totalizer tubes. The operation of the auxiliary anode affecting this carry is basically as disclosed in M. A. Townsend Patent 2,635,810.

While this specific embodiment and the exemplary operation thereof have been described with the highest order register tube, namely that for the ten thousandth digit, being pulsed first, it is to be understood that in other embodiments of this invention the register tubes may actually be stepped in any order at all, the more usual orders being from the highest value digit to the lowest value digit or from the lowest value digit to the highest value digit. However, circuits in accordance with this invention are not limited even to these two specific orders of operation.

When a particular summation has been obtained and it is desired to reset the totalizer tubes 10 through 16, a switch 92, seen in Fig. 2, is closed and a switch 93 opened, the two switches advantageously being mechanically ganged together. Closing of switch 92 applies a normalizing pulse, which in this embodiment is again ground, to the normalizing or zero bus 94 connected through resistances 95 to each of the normal or zero rest cathodes of the stepping tubes 10 through 16. Opening the switch 93 at the same time removes the positive supply from the auxiliary anodes 104 of the stepping tubes, thereby preventing transfer of a carry pulse to the next stepping tube on occurrence of a discharge at the tenth rest cathode.

While this specific illustrative embodiment has been described in terms of a direct visual registration of the finally summed number by the totalizer stepping tubes, it is to be understood that the sums may automatically be applied to subsequent electronic circuitry by connecting individual load resistors to each rest cathode of the totalizer stepping tubes and taking the output from across these resistors, as is known in the art. Similarly, while manual setting of the switches 127 has been depicted for registration of the number to be added in the register portion of this specific embodiment, these numbers may automatically be set in the tube circuitry by utilizing stepping switches or other circuitry known in the art to cause the contact or wiper 18 automatically to locate the desired contact 126.

Thus it is to be understood that the above-described arrangements are illustrative of the application of the principles of the invention. Numerous other arrangements may be devised by those skilled in the art without departing from the spirit and scope of the invention.

What is claimed is:

1. An electronic computing circuit comprising first and second pluralities of stepping tubes, each of said first stepping tubes having associated with it a corresponding one of said second stepping tubes, means for designating digits by a circuit condition associated with each of said first stepping tubes, means for applying input pulses to each associated pair of said first and second stepping tubes in turn to transfer the digit designation associated with each first stepping tube to its corresponding second stepping tube, and means for terminating the pulses applied to each of said pairs of tubes upon the application of a number of said pulses equal to the digit designated by the particular circuit condition associated with the first stepping tube of the pair being pulsed.

2. An electronic computing circuit comprising a plurality of register stepping tubes, a plurality of totalizer stepping tubes, each of said register stepping tubes having associated with it a corresponding one of said totalizer stepping tubes, each of said register tubes having a common input with its corresponding totalizer tube, means for designating a digit by a circuit state associated with each of said register tubes, means for applying pulses to said common inputs in succession, and means for terminating the application of pulses to each of said common inputs in turn when the number of pulses equal to the digit designation associated with its register stepping tube has been applied whereby the digit designations associated with said register stepping tubes are transferred to said corresponding totalizer stepping tubes.

3. An electronic computing circuit comprising a plurality of register stepping tubes, a plurality of totalizer stepping tubes, each of said register stepping tubes having associated with it a corresponding one of said totalizer stepping tubes, carry pulse means interconnecting successive of said totalizer stepping tubes, each of said register stepping tubes having a common input with its corresponding totalizer stepping tube, means for designating a digit by a circuit condition associated with each of said register tubes, pluse generator means, means for applying pulses from said pulse generator means to a first of said register tubes, and means for applying pulses from said generating means to successive of said register tubes as the prior register tubes have counted the number of pulses equal to the digit thereby designated.

4. An electronic computing circuit comprising a plurality of register stepping tubes each having a plurality of rest cathodes and a zero cathode therein, each of said rest cathodes being assigned a digit representation corresponding to its position with respect to the zero cathode in the tube, a plurality of totalizer stepping tubes, each of said register stepping tubes having associated with it a corresponding one of said totalizer stepping tubes, each of said register stepping tubes having a common input with its corresponding totalizer stepping tube, pulse generator means, means for designating digits by a circuit condition associated with each of said register stepping tubes, said designating means including means for connecting said pulse generator means to the rest cathode assigned to the digit being stored, means for applying pulses to said common inputs in succession, and means for terminating the application of pulses to each of said common inputs in turn on stepping of the discharge in each said register tube to its rest cathode connected to said pulse generator means.

5. An electronic computing circuit comprising a plurality of register stepping tubes each having a plurality of rest cathodes and a zero cathode therein, each of said rest cathodes being assigned a digit representation corresponding to its position with respect to said zero cathode, a plurality of totalizer stepping tubes, each of said register stepping tubes having associated with it a corresponding one of said totalizer stepping tubes, each of said register stepping tubes having a common input with its corresponding totalizer stepping tube, carry pulse means interconnecting successive of said totalizer stepping tubes, pulse generator means, means for applying pulses from said generator means to said common input terminals to cause discharges in said register and totalizer stepping tubes to transfer to successive rest cathodes, and means for terminating the application of said pulses after the number of pulses corresponding to a digit designated by a circuit condition associated with a register tube has been applied to said common input means, said terminating means comprising means connecting the rest cathodes of said register stepping tubes assigned to said designated digits to said pulse generator means.

6. An electronic computing circuit comprising a plurality of register stepping tubes each having a plurality of rest cathodes and a zero cathode, each of said rest cathodes being assigned a digit representation corresponding to its position with respect to said zero cathode, a plurality of totalizer stepping tubes, each of said register stepping tubes having associated with it a corresponding one of said totalizer stepping tubes, each of said register stepping tubes having a common input with its corresponding totalizer stepping tube, carry pulse means interconnecting successive of said totalizer tubes, means for registering a digit in circuitry associated with each of said register stepping tubes, said registering means comprising switch means selectively connected to one of said rest cathodes of each of said register tubes, pulse generator means for applying pulses to said common input terminals to cause discharges in said register and totalizer tubes to transfer to successive cathodes, and means for terminating the application of said pulses after the number of pulses corresponding to the digit designated by said registering means has been applied to said common input means, said terminating means including means connecting said switching means to said pulse generator means.

7. An electronic computing circuit in accordance with claim 6 wherein said pulse generator means comprises control tube means for each of said register stepping tubes, said switching means being individually connected to said control tube means for each register stepping tube.

8. An electronic computing circuit comprising a plurality of register stepping tubes, each having a plurality of rest cathodes and a zero cathode therein, each of said rest cathodes being assigned a digit representation corresponding to its position with respect to said zero cathode, a plurality of totalizer stepping tubes, each of said register stepping tubes having associated with it a corresponding one of said totalizer stepping tubes, each of said register stepping tubes having a common input with its corresponding totalizer stepping tube, carry pulse means interconnecting successive of said totalizer tubes, means for registering a digit in circuitry associated with each of said register tubes, said means comprising switching means selectively connected to one of said rest cathodes of each of said register stepping tubes, pulse generator means comprising a pair of discharge devices for each of said register means, one of said devices being a control device and the other a pulser device, means connecting said pulser devices to said common input terminals for delivering pulses to said common input terminals, means for terminating the application of pulses to said common input terminals after the number of pulses corresponding to said registered digit has been applied, said terminating means including said switch means and said control devices, and means for enabling only one of said pulser devices at a time.

9. An electronic computing circuit in accordance with claim 8 wherein said control and pulser devices are gaseous discharge devices having control electrodes, said switching means being connected to the control electrodes of said control devices and the control electrodes of said pulser devices being connected to said control devices.

10. An electronic computing circuit in accordance with claim 9 further comprising means for resetting said register tubes on conduction of the last of said control gaseous discharge devices, said means including relay means for causing a discharge to occur at said zero cathodes of said register tubes.

11. An electronic adder circuit comprising a plurality of register stepping tubes each having a plurality of rest cathodes and a zero cathode therein, each of said register tube rest cathodes being assigned a digit representation corresponding to its position with respect to said zero cathode, a plurality of totalizer stepping tubes each having a plurality of rest cathodes and a zero cathode therein, each of said totalizer tube rest cathodes being assigned a digit representation, each of said register stepping tubes having associated with it a corresponding one of said totalizer stepping tubes, each of said register stepping tubes having a common input with its corresponding totalizer stepping tube, carry pulse means interconnecting successive of said totalizer tubes, switching means individually associated with each register stepping tube selectively connected to one of said register stepping tube rest cathodes to register a digit according to the condition of said switching means, pulse generator means including interconnected control discharge and pulser discharge devices individual to each of said register tubes, means connecting each pulser discharge device with an associated common input, means for energizing said pulser discharge devices one at a time to transmit stepping pulses to said common inputs, means connecting said switch means of each register tube to said control discharge device individual thereto to inhibit the transmission of pulses from said pulser device on occurrence of a discharge at the rest cathode to which said switch means is connected, and means for enabling the next of said pulser devices on conduction in the control device associated with the prior register stepping tube.

12. An electronic adder circuit in accordance with claim 11 further comprising digit indicating means encompassing the envelope of each of said totalizer stepping tubes and adjacent the rest cathodes thereof assigned to those digits.

13. An electronic adder circuit in accordance with claim 11 further comprising relay means for resetting said register tubes on conduction in the last of said control discharge devices.

References Cited in the file of this patent

UNITED STATES PATENTS

| | | |
|---|---|---|
| 2,405,096 | Mumma | July 30, 1946 |
| 2,442,428 | Mumma | June 1, 1948 |
| 2,528,100 | Williams | Oct. 31, 1950 |
| 2,607,891 | Townsend | Aug. 19, 1952 |
| 2,664,555 | Thomas | Dec. 29, 1953 |
| 2,714,179 | Thomas | July 26, 1955 |

OTHER REFERENCES

Tooke: "A Cold Cathode Batching Counter," Electronic Engineering, vol. XXVI, No. 314, April 1954, pages 160–163.